Patented Apr. 30, 1935

1,999,403

UNITED STATES PATENT OFFICE 1,999,403

MANUFACTURE OF HYDROXY ALIPHATIC ACIDS

Henry Dreyfus, London, England

No Drawing. Application March 8, 1929, Serial No. 345,447. In Great Britain March 24, 1928

18 Claims. (Cl. 260—112)

This invention relates to the manufacture of ω-hydroxy aliphatic monocarboxylic acids and derivatives thereof.

According to the present invention ω-hydroxy aliphatic monocarboxylic acids are prepared by reduction of mono esters of aliphatic di-carboxylic acids or salts of such esters.

The acid may be produced in the free state, as a salt or as the ester or as mixtures thereof according to the conditions of reduction and the nature of the starting materials. Any ester produced may be saponified to the free acid, while salts may be treated with mineral acid.

I have found that the best yields are obtained if the reduction is carried out by means of hydrogen or hydrogen containing gases with or without pressure in presence of a suitable catalyst. As catalyst I may employ any suitable hydrogenation catalyst, for example nickel, copper, platinum, palladium, cobalt or iron, and as reducing gases I may employ pure hydrogen or gases containing hydrogen with or without carbon monoxide, for example, water gas, town gas, producer gas, or the like.

In carrying out the hydrogenation the mono ester of the aliphatic di-carboxylic acid may, if desired, be dissolved or mixed with an inert diluent.

The following examples illustrate the invention but are not intended to limit it in any way:—

Example 1

An aqueous solution of potassium ethyl oxalate (KOOC.COOC$_2$H$_5$) is charged into a copper lined autoclave provided with a stirrer. A powdered nickel catalyst, obtained by reduction with hydrogen of nickel carbonate at about 300° C., is added. The reduction is carried out by means of hydrogen introduced under pressure, for example at 100–150 atmospheres. When hydrogen ceases to be absorbed, the potassium glycollate (OHCH$_2$.COOK) is separated in known manner. The formation of the potassium glycollate may be represented by the following equation:

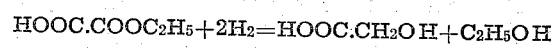

Example 2

Mono-ethyl oxalate (HOOC.COOC$_2$H$_5$) is introduced into a copper lined autoclave fitted with a stirrer. A powdered nickel catalyst, prepared as in Example 1, is added and the reduction effected at a temperature of 80–100° C. by introduction of hydrogen under pressure, for instance a pressure of about 100 atmospheres. The formation of the glycollic acid may be represented by the following equation:

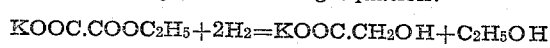

In a similar manner the mono-methyl, propyl or other mono esters of oxalic acid may be reduced or the mono-methyl, ethyl, propyl or other mono esters of malonic acid or succinic acid or other mono esters of aliphatic dicarboxylic acids.

The hydroxy aliphatic monocarboxylic acids obtained may be etherified or esterified, for example so as to introduce the methoxy or acetate radicles.

What I claim and desire to secure by Letters Patent is:—

1. Process for the production of hydroxy aliphatic monocarboxylic acids and their salts, which comprises subjecting to catalytic hydrogenation a compound selected from the group consisting of mono-alkyl esters and alkyl ester-salts of aliphatic dicarboxylic acids.

2. Process for the production of hydroxy aliphatic monocarboxilic acids and their salts, which comprises subjecting to catalytic hydrogenation a compound selected from the group consisting of mono-alkyl esters of aliphatic dicarboxylic acids and alkali metal salts of such esters.

3. Process for the production of hydroxy aliphatic monocarboxylic acids, comprising subjecting mono-alkyl esters of aliphatic dicarboxylic acids to catalytic hydrogenation.

4. Process for the production of hydroxy aliphatic monocarboxylic acids, comprising subjecting mono-alkyl esters of aliphatic dicarboxylic acids to catalytic hydrogenation in presence of a nickel catalyst.

5. Process for the production of glycollic acid, comprising subjecting mono-alkyl esters of oxalic acid to catalytic hydrogenation.

6. Process for the production of glycollic acid, comprising subjecting mono-alkyl esters of oxalic acid to catalytic hydrogenation in presence of a nickel catalyst.

7. Process for the production of glycollic acid, comprising subjecting mono-alkyl esters of oxalic acid to catalytic hydrogenation in presence of an inert medium.

8. Process for the production of hydroxy aliphatic mono-carboxylic acids which comprises subjecting mono-alkyl esters of aliphatic dicarboxylic acids to catalytic hydrogenation in the absence of liquid diluents.

9. Process for the production of glycollic acid, comprising subjecting mono-alkyl esters of oxalic acid to catalytic hydrogenation in presence of a nickel catalyst and an inert medium.

10. Process for the production of salts of hydroxy aliphatic mono-carboxylic acids, comprising subjecting the corresponding salts of mono-alkyl esters of aliphatic dicarboxylic acids to catalytic hydrogenation.

11. Process for the production of salts of hydroxy aliphatic mono-carboxylic acids, comprising subjecting the corresponding salts of mono-alkyl esters of aliphatic di-carboxylic acids to catalytic hydrogenation in the presence of a nickel catalyst.

12. Process for the production of a salt of glycollic acid, comprising subjecting the corresponding salt of a mono-alkyl ester of oxalic acid to catalytic hydrogenation.

13. Process for the production of a salt of glycollic acid, comprising subjecting the corresponding salt of a mono-alkyl ester of oxalic acid to catalytic hydrogenation in the presence of a nickel catalyst.

14. Process for the production of a salt of glycollic acid, comprising subjecting the corresponding salt of a mono-alkyl ester of oxalic acid to catalytic hydrogenation in the presence of an inert medium.

15. Process for the production of a salt of glycollic acid, comprising subjecting the corresponding salt of a mono-alkyl ester of oxalic acid to catalytic hydrogenation in the presence of a nickel catalyst and an inert medium.

16. Process for the production of hydroxy aliphatic mono-carboxylic acids and their salts, which comprises subjecting to catalytic hydrogenation, under pressure, a compound selected from the group consisting of mono-alkyl esters and alkyl ester salts of aliphatic dicarboxylic acids.

17. Process for the production of hydroxy aliphatic mono-carboxylic acids and their salts, which comprises subjecting to catalytic hydrogenation, under a pressure of at least 100 atmospheres, a compound selected from the group consisting of mono-alkyl esters and alkyl ester salts of aliphatic dicarboxylic acids.

18. Process for the production of hydroxy aliphatic mono-carboxylic acids and their salts, which comprises subjecting to catalytic hydrogenation, under a pressure of 100–150 atmospheres in the presence of a nickel catalyst, a compound selected from the group consisting of mono-alkyl esters and alkyl ester salts of aliphatic dicarboxylic acids.

HENRY DREYFUS.